(12) United States Patent
Ren et al.

(10) Patent No.: US 11,496,043 B2
(45) Date of Patent: Nov. 8, 2022

(54) VEHICLE ON-BOARD CHARGER WITH SNUBBER CIRCUIT

(71) Applicant: LEAR CORPORATION, Southfield, MI (US)

(72) Inventors: Xuebei Ren, Shanghai (CN); ZhenYu Chen, Shanghai (CN); Jiyang Liu, Shanghai (CN)

(73) Assignee: Lear Corporation, Southfield, MI (US)

( * ) Notice: Subject to any disclaimer, the term of this patent is extended or adjusted under 35 U.S.C. 154(b) by 50 days.

(21) Appl. No.: 17/208,148

(22) Filed: Mar. 22, 2021

(65) Prior Publication Data

US 2021/0344270 A1 Nov. 4, 2021

Related U.S. Application Data

(60) Provisional application No. 63/017,861, filed on Apr. 30, 2020.

(51) Int. Cl.

| | |
|---|---|
| *H02M 7/06* | (2006.01) |
| *H02M 1/44* | (2007.01) |
| *H02M 1/42* | (2007.01) |
| *B60L 50/50* | (2019.01) |
| *B60L 53/60* | (2019.01) |
| *B60L 53/16* | (2019.01) |
| *H02M 1/34* | (2007.01) |

(52) U.S. Cl.
CPC ........... *H02M 1/4208* (2013.01); *B60L 50/50* (2019.02); *B60L 53/16* (2019.02); *B60L 53/60* (2019.02); *H02M 1/34* (2013.01); *B60L 2210/30* (2013.01)

(58) Field of Classification Search
CPC .... H02M 1/44; H02M 1/4233; H02M 1/4208; H02M 1/007; H02M 1/348; H02M 1/36; H02M 1/4225; H02M 1/346; H02M 1/4216; H02M 1/0009; H02M 1/0085; H02M 1/34; B60L 53/22; B60L 53/16; B60L 53/60; B60L 50/50; B60L 2210/30; Y02T 10/7072; Y02T 90/14; Y02T 10/70; Y02T 90/12
See application file for complete search history.

(56) References Cited

U.S. PATENT DOCUMENTS

| | | | | |
|---|---|---|---|---|
| 5,886,429 | A | * | 3/1999 | Grady ................... G01R 31/001 307/106 |
| 9,884,560 | B2 | * | 2/2018 | Jang ....................... B60L 53/53 |
| 2016/0264012 | A1 | * | 9/2016 | Im ............................ B60L 53/18 |
| 2017/0133837 | A1 | * | 5/2017 | Hasan .................... H02H 9/001 |
| 2017/0329380 | A1 | * | 11/2017 | Hung ................... H02M 1/4225 |

(Continued)

*Primary Examiner* — Jared Fureman
*Assistant Examiner* — Esayas G Yeshaw
(74) *Attorney, Agent, or Firm* — Brooks Kushman P.C.

(57) ABSTRACT

An on-board charger is provided with a bulk capacitor adapted to couple to a vehicle traction battery and a relay for receiving electrical power from an external power supply and to pre-charge the bulk capacitor. A power factor correction (PFC) circuit is connected between the bulk capacitor and the relay. The PFC circuit includes a switch that is adjustable between an on-position and an off-position. The switch enables current flow from the relay to the bulk capacitor in the off-position. A snubber circuit is coupled to the switch to damp a transient voltage present at the switch during a transition from the on-position to the off-position. A processor is programmed to control the switch.

20 Claims, 7 Drawing Sheets

(56) References Cited

U.S. PATENT DOCUMENTS

| | | | |
|---|---|---|---|
| 2019/0020265 A1* | 1/2019 | Ikarashi | H02M 3/335 |
| 2020/0122582 A1* | 4/2020 | Curuvija | B60L 50/40 |
| 2020/0251996 A1* | 8/2020 | Perichon | H02M 3/3353 |
| 2020/0298722 A1* | 9/2020 | Smolenaers | B60L 53/53 |
| 2022/0158545 A1* | 5/2022 | Tan | H02M 3/1586 |

* cited by examiner

VEHICLE ON-BOARD CHARGER WITH SNUBBER CIRCUIT

CROSS-REFERENCE TO RELATED APPLICATIONS

This application claims the benefit of U.S. provisional application Ser. No. 63/017,861 filed Apr. 30, 2020, the disclosure of which is hereby incorporated in its entirety by reference herein.

TECHNICAL FIELD

One or more embodiments relate to a vehicle on-board charger that includes a snubber circuit.

BACKGROUND

Electrified vehicles, including pure electric vehicles and hybrid electric vehicles, include a high-voltage battery pack that is used for propulsion or "traction" of the vehicle, and may be referred to as a traction battery. Such electrified vehicles include power electronics for converting power supplied to and from the traction battery. Such power electronics generate electromagnetic energy that may affect other systems and components. Electromagnetic compatibility (EMC) refers to the ability of electrical equipment and systems to function acceptably in their electromagnetic environment, by limiting the unintentional generation, propagation and reception of electromagnetic energy which may cause unwanted effects such as electromagnetic interference (EMI) in operational equipment.

SUMMARY

In one embodiment, an on-board charger is provided with a charge port for receiving a charge connector from an external power supply to facilitate battery charging, a bulk capacitor, and a relay for pre-charging the bulk capacitor. A power factor correction (PFC) circuit is connected between the bulk capacitor and the relay and includes a switch and a snubber circuit that is coupled to the switch to damp a transient voltage present at the switch during a switch-off condition. A processor is programmed to control the switch to enable/disable current flow from the relay to the bulk capacitor.

In another embodiment an on-board charger is provided with a power factor correction (PFC) circuit and a processor. The PFC circuit is connected between a bulk capacitor and a relay for pre-charging the bulk capacitor and includes a switch and a snubber circuit that is coupled to the switch to damp a transient voltage present at the switch during a switch-off condition. The processor is programmed to control the switch to enable/disable current flow from the relay to the bulk capacitor.

In one embodiment, an on-board charger is provided with a bulk capacitor adapted to couple to a vehicle traction battery and a relay for receiving electrical power from an external power supply and to pre-charge the bulk capacitor. A power factor correction (PFC) circuit is connected between the bulk capacitor and the relay. The PFC circuit includes a switch that is adjustable between an on-position and an off-position. The switch enables current flow from the relay to the bulk capacitor in the off-position. A snubber circuit is coupled to the switch to damp a transient voltage present at the switch during a transition from the on-position to the off-position. A processor is programmed to control the switch.

In another embodiment, an on-board charger is provided with a power factor correction (PFC) circuit that is connected between a bulk capacitor and a relay for pre-charging the bulk capacitor. The PFC circuit includes a switch, and a snubber circuit that is coupled to the switch to damp a transient voltage present at the switch during a switch-off condition. A processor is programmed to control the switch to enable/disable current flow from the relay to the bulk capacitor.

In yet another embodiment a power factor correction (PFC) circuit is provided to connect between a bulk capacitor and a relay of an on-board charger for pre-charging the bulk capacitor. The PFC circuit includes a switch and a snubber circuit. The switch is adjustable between an on-position and an off-position. The switch enables current flow from the relay to the bulk capacitor in the off-position. The snubber circuit includes a capacitor that is coupled across the switch to damp a transient voltage present at the switch during a transition from the on-position to the off-position

BRIEF DESCRIPTION OF THE DRAWINGS

FIG. 4A is an enlarged view of a portion of the graph of FIG. 4, illustrating various characteristics of the measured signals when the first switch is turned on.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
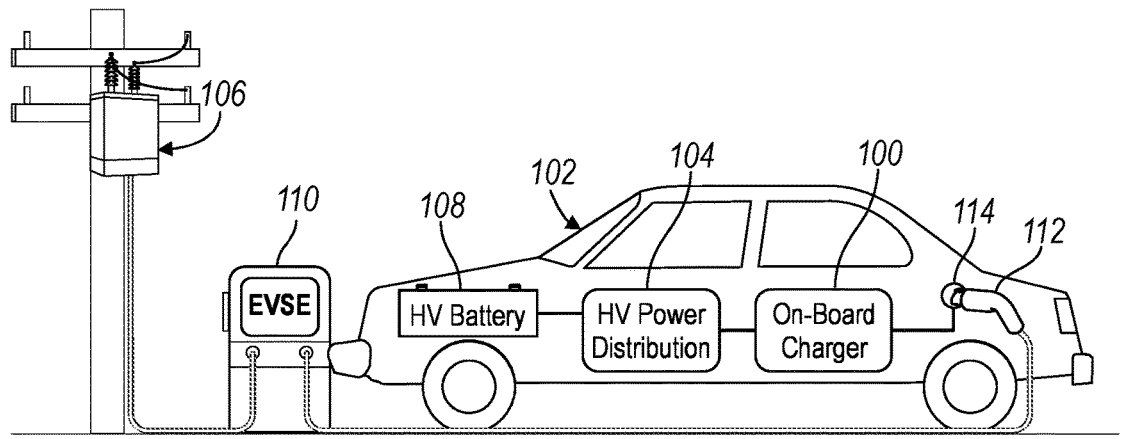
FIG. 1 is a schematic diagram of an electrified vehicle with an on-board charger, according to one or more embodiments.

With reference to FIG. 1, an on-board charger (OBC) is illustrated in accordance with one or more embodiments and generally referenced by numeral 100. The OBC 100 is depicted within a vehicle 102 and electrically connects a high-voltage (HV) power distribution module 104 to an external power supply 106 for charging a traction battery 108. The OBC 100 and the HV power distribution module 104 collectively condition the power supplied from the external power supply 106 to provide the proper voltage and current levels to the traction battery 108. This might typically be in the hundreds of volts, such as a voltage of 300 volts or more. In one or more embodiments the OBC 100 includes a snubber circuit to damp transient voltage present during electronic switching conditions.

The external power supply 106 is electrically coupled to electric vehicle supply equipment (EVSE) 110, e.g., a charger or a charging station. The external power supply 106 is an electrical power distribution network or grid as provided by an electric utility company, according to one or more embodiments. The EVSE 110 provides circuitry and controls to regulate and manage the transfer of energy between the external power supply 106 and the vehicle 102. The external power supply 106 provides alternating current (AC) electric power to the EVSE 110. The EVSE 110 includes a charge connector 112 for plugging into a charge port 114 of the vehicle 102. The charge port 114 may be any type of port to transfer power from the EVSE 110 to the OBC 100.

Figure 2:
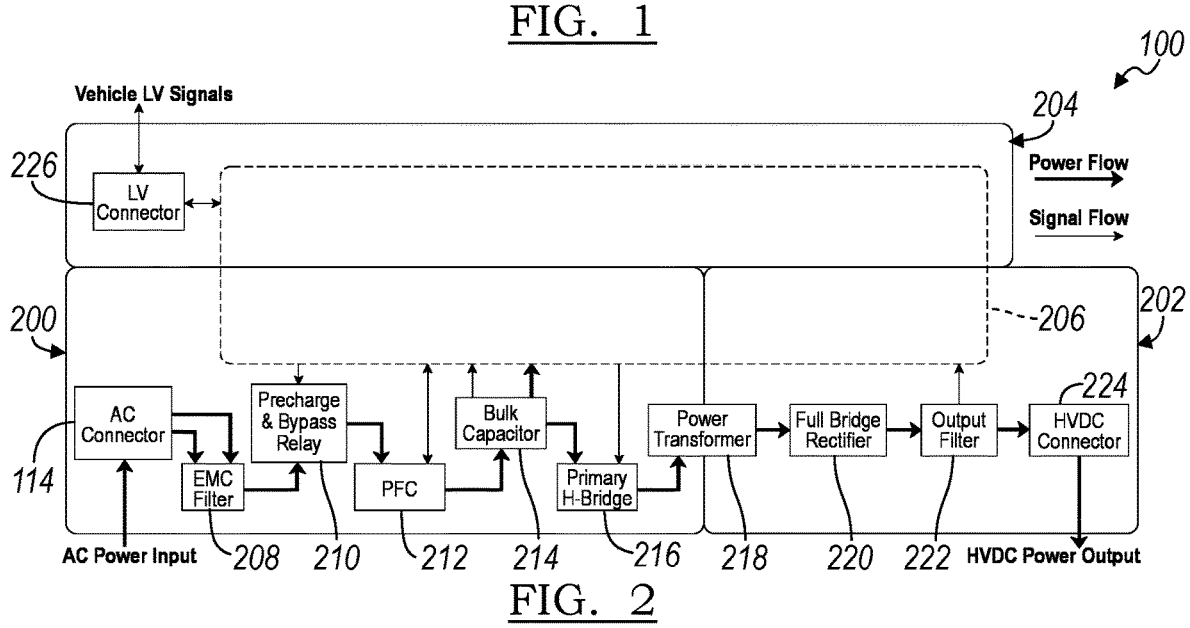
FIG. 2 is a block diagram of the on-board charger of FIG. 1.

Referring to FIG. 2, the OBC 100 converts the AC power received at the charge port 114 from the EVSE 110 to a high-voltage (HV) direct current (DC) power output. The OBC 100 includes a primary voltage zone 200, a high voltage (HV) zone 202, a low voltage (LV) zone 204, and a controller 206. The controller 206 controls the components of the primary voltage zone 200, the high voltage (HV) zone 202, and the low voltage (LV) zone 204.

The primary voltage zone 200 includes the charge port 114, an electromagnetic compatibility (EMC) filter 208, a pre-charge and bypass relay 210, a power factor correction (PFC) circuit 212, a bulk capacitor 214, a primary H-bridge 216, and a power transformer 218. The EMC filter 208 filters the AC mains voltage to reject high-frequency noise. The pre-charge and bypass relay 210 is used to pre-charge the bulk capacitor 214 before charging the traction battery 108 to avoid an electrical current surge from the external power supply 106 when the OBC 100 is connected. The power factor correction (PFC) circuit 212 is responsible for keeping a power factor (PF) close to unity. The bulk capacitor 214 includes a high capacitance, e.g., 100 µF to 3 mF, and decouples the electrical power that comes from the AC-side at twice the line frequency to provide a regulated DC voltage node between the primary voltage zone 200 and the HV zone 202.

The HV zone 202 includes a full bridge rectifier 220, an output filter 222 and an HV DC connector 224. The primary H-bridge 216, the power transformer 218, and the full bridge rectifier 220 collectively convert the AC power to DC power. The output filter 222 filters the HV DC voltage to remove noise. The HV DC connector 224 connects to the HV power distribution module 104 to transfer electrical power between the OBC 100 and the traction battery 108.

The LV zone 204 includes a LV connector 226 that connects to other vehicle systems, or buses, e.g., a CAN bus, for communicating with other vehicle systems.

Figure 3:
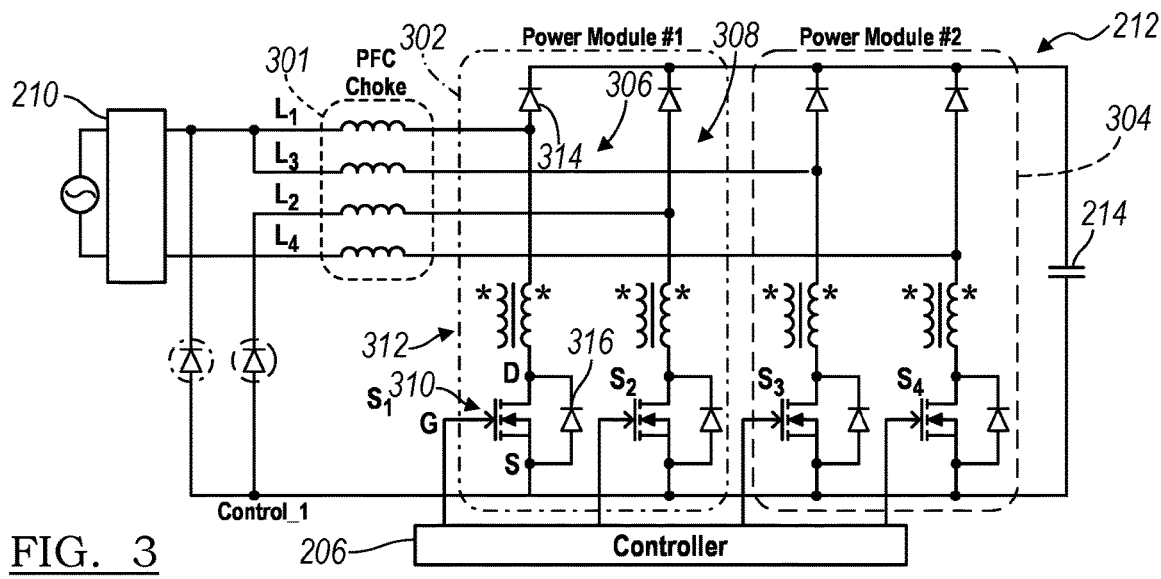
FIG. 3 is a circuit diagram illustrating a portion of the on-board charger of FIG. 2, including multiple switches.

With reference to FIG. 3, the PFC circuit 212 receives AC power from the pre-charge and bypass relay 210 and provides AC power to the bulk capacitor 214. The PFC circuit 212 is responsible for keeping the power factor of the AC power close to unity. The PFC circuit 212 includes a choke 301, a first power module 302, and a second power module 304. The choke 301 includes four inductors L1, L2, L3, and L4 that function as boost inductors and cooperate with the power modules 302, 304 to raise the voltage supplied to the bulk capacitor 214.

Each power module 302, 304, includes a pair of switch circuits, and each switch circuit includes a switch, (e.g., S1, S2, S3, or S4) that is coupled to one of the inductors L1-L4 to provide a ground path, according to the illustrated embodiment. The first power module 302 includes a first switch circuit 306 and a second switch circuit 308. The first switch circuit 306 includes a first switch 310 (S1), an inductor 312, and a diode 314. The inductor 312 is the primary winding of a current sense transformer that may be used to measure the current through the first switch 310. The first switch circuit 306 also includes a parasitic diode 316 that is connected in parallel with the first switch 310. The parasitic diode 316, or body diode, blocks current in one direction and may be used as a freewheeling diode for inductive loads. The first switch 310, together with the parasitic diode 316, are connected in series with the inductor 312 and the diode 314. The first switch 310 is a metal-oxide-semiconductor field-effect transistor (MOSFET) according to one embodiment. A MOSFET is a three-terminal semiconductor device that includes a source (S), a gate (G), and a drain (D).

The first switch 310 is adjustable between an on-position and an off-position. The first switch circuit 306 provides a ground path to disable current flow from the relay 210 through L1 to the bulk capacitor 214, when the first switch 310 is arranged in the on-position. The first switch circuit 306 enables current flow from the relay 210 through L1 to the bulk capacitor 214, when the first switch 310 is arranged in the off-position. The controller 206 controls each switch circuit by providing a control signal to each gate, e.g., by providing Control_1 to the gate (G) of the first switch 310. Switches S2, S3, and S4 include similar structure and functionality as described for S1, according to one or more embodiments.

The PFC circuit 212 keeps the power factor of the AC power close to unity by controlling the duty cycle of the switches S1, S2, S3, and S4. The choke inductors L1, L2, L3, and L4 store and release energy when the corresponding switch S1, S2, S3, S4 turn ON and OFF, then the stored energy is released to the bulk capacitor 214. The controller 206 controls the duty cycle of switches S1, S2, S3, S4 to control the AC current corresponding to the changes in the AC voltage, which results in a power factor close to unity.

Figure 4:
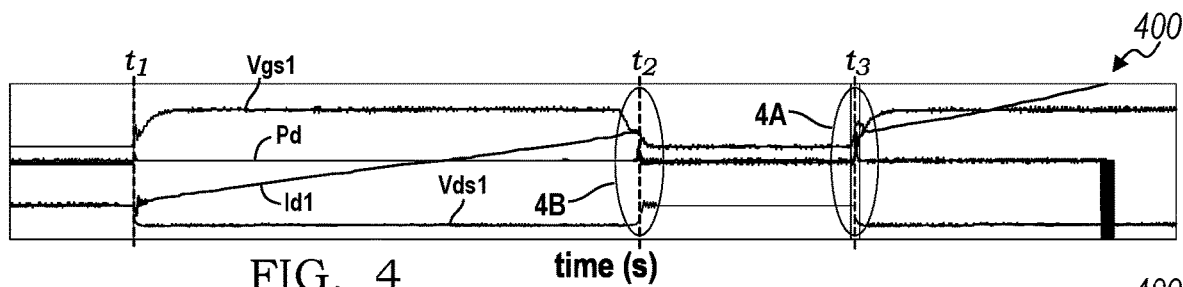
FIG. 4 is a graph of signals measured at a first switch of FIG. 3, illustrating various characteristics over time.

FIG. 4 is a graph 400 of signals measured at the first switch 310 of the first switch circuit 306 over time. The first curve (Vgs1) represents the voltage potential between the gate (G) and the source (S) of the first switch 310. The second curve (Vds1) represents the voltage potential between the drain (D) and the source (S) of the first switch 310. The third curve (Id1) represents the current through the drain (D) of the first switch 310. The fourth curve (Pd) represents the power through the drain (D) of the first switch 310. The graph 400 illustrates the signals during operation as the controller 206 controls the first switch 310 to turn on and off. The controller 206 turns the first switch 310: on at time $t_1$, off at time $t_2$, and on again at time $t_3$.

Figure 4A:
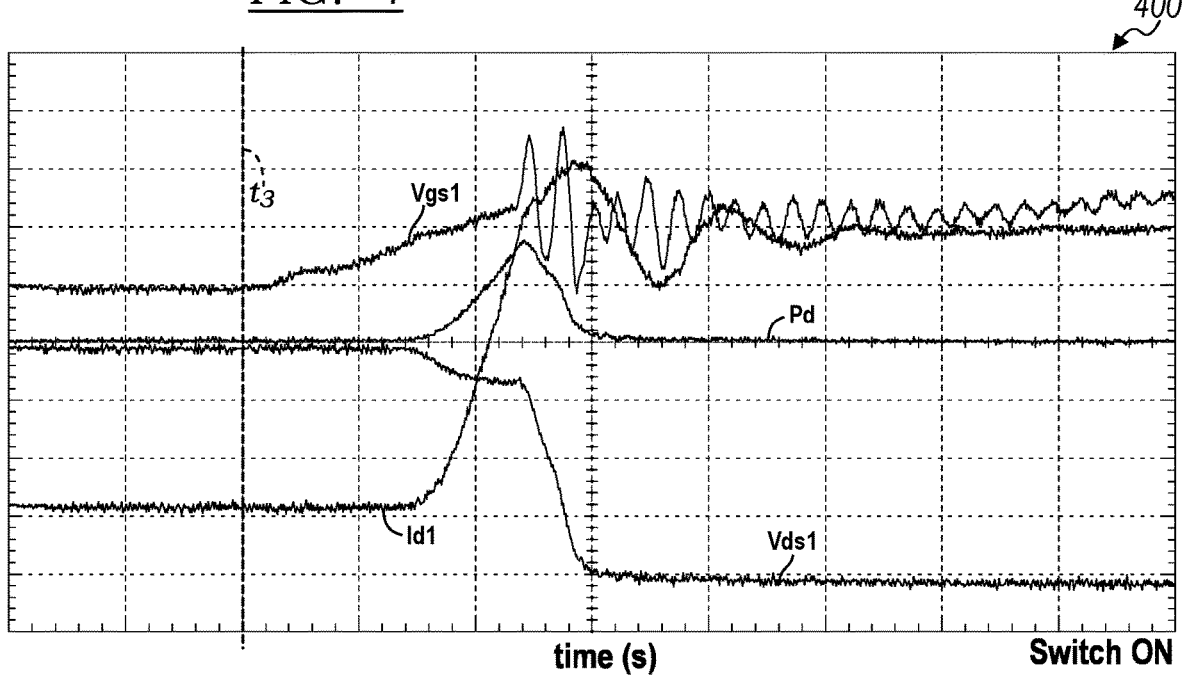
Figure 4B:
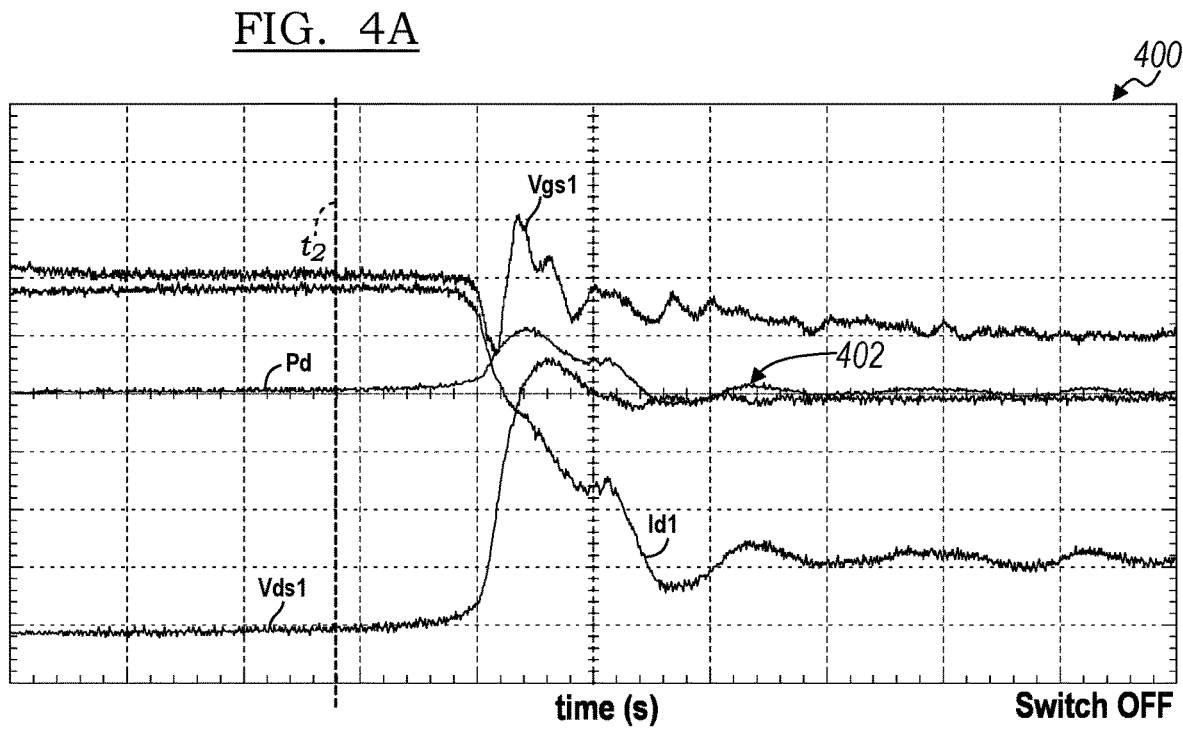
FIG. 4B is an enlarged view of a portion of the graph of FIG. 4, illustrating various characteristics of the measured signals when the first switch is turned off.

FIG. 4A is an enlarged view of a portion of the graph 400 when the first switch 310 is turned on at time $t_3$, and FIG. 4B is an enlarged view of a portion of the graph 400 when the first switch 310 is turned off at time $t_2$. With reference to FIG. 4B, when the first switch 310 is closed, the drain current (Id1) decreases rapidly which causes the voltage potential (Vds1) to increase sharply due to stray inductances within the first switch circuit 306. This transient voltage oscillates before settling, as referenced by numeral 402, which could cause electromagnetic interference (EMI) in other devices.

Figure 5:
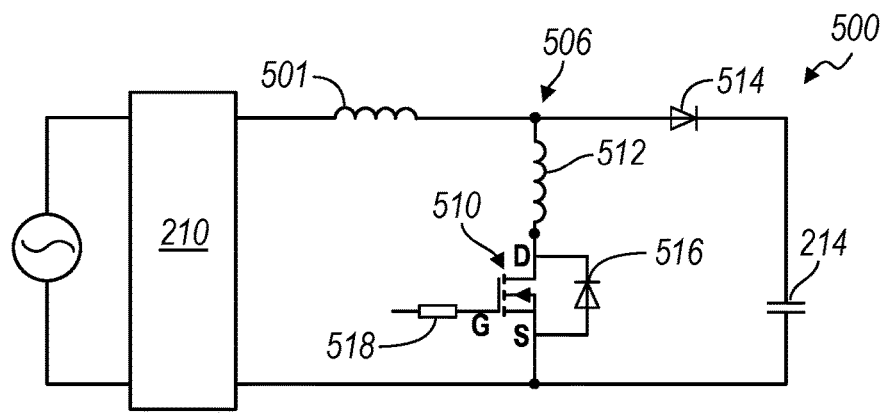
FIG. 5 is a simplified circuit diagram of the circuit of FIG. 3 according to one or more embodiments, illustrating the first switch.

With reference to FIG. 5, a PFC circuit is illustrated in accordance with one or more embodiments and is generally referenced by numeral 500. The PFC circuit 500 is connected between the pre-charge and bypass relay 210 and the bulk capacitor 214 described above with reference to FIG. 2. The PFC circuit 500 includes a choke 501 and a first switch circuit 506. The first switch circuit 506 includes a first switch 510, an inductor 512 to measure drain current, and a diode 514. The first switch circuit 506 also includes a parasitic diode 516 that is connected in parallel with the first switch 510, and a resistor 518 that is connected between the gate (G) of the first switch 510 and the gate drive circuitry of the controller 206 (FIG. 3). In one embodiment, the resistor 518 has a resistance of approximately 6.8 ohms.

Figure 6:
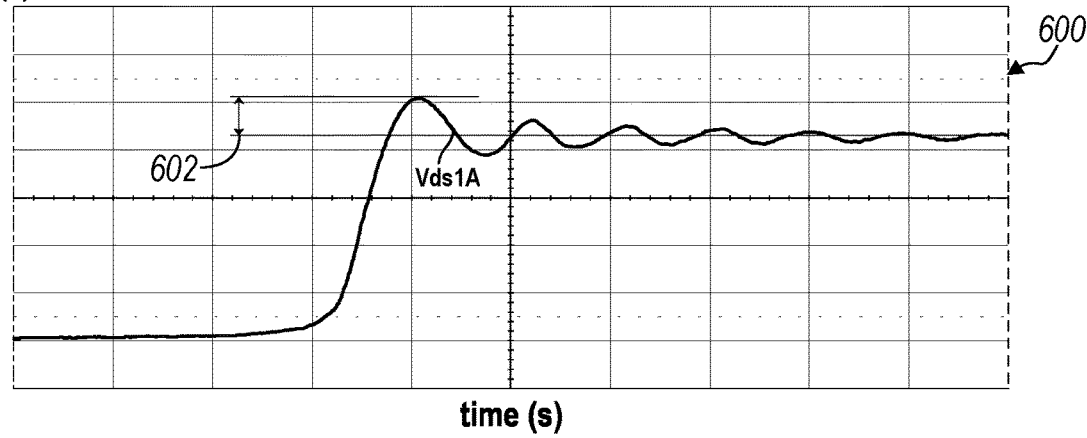
FIG. 6 is a graph of a voltage measured at the first switch of FIG. 5 when the switch is turned off.

FIG. 6 is a graph 600 including a curve (Vds1A) that represents the voltage potential between the drain (D) and the source (S) of the first switch 510 when the first switch 510 is turned off. When the first switch 510 is closed, the drain current (not shown) decreases rapidly which causes the voltage potential (Vds1A) to increase sharply due to stray inductances within the first switch circuit 506. As shown in FIG. 6, after the first switch 510 is closed, the resultant transient voltage of Vds1A overshoots the supply voltage by approximately 50 volts, as referenced by numeral 602.

Figure 7:
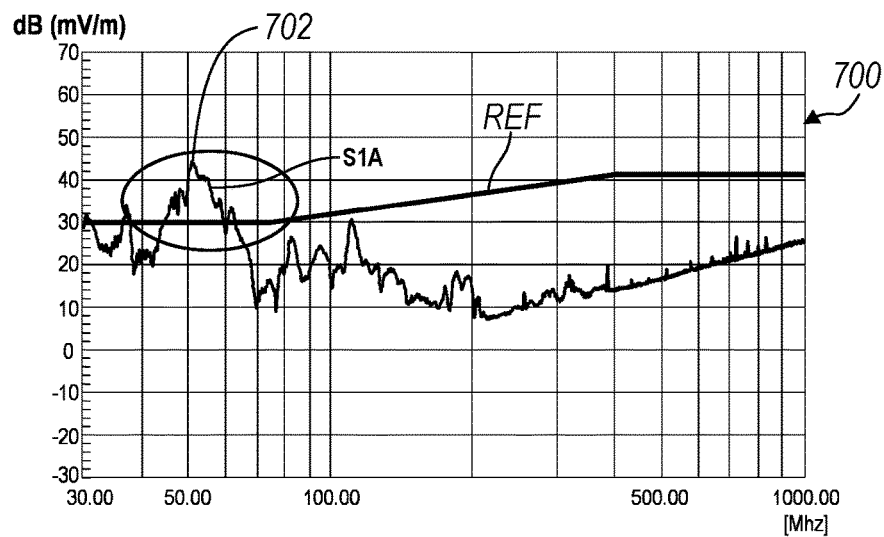
FIG. 7 is a graph of signals measured during a radio broadband electromagnetic compatibility (EMC) test of the vehicle during battery charging while the on-board charger, including the first switch of FIG. 5, is active.

FIG. 7 is a graph 700 of signals measured during a radio broadband electromagnetic compatibility (EMC) test of the vehicle 102 during battery charging. Generally, a system is electromagnetically compatible if it: does not cause interference with other systems; is not susceptible to emissions from other systems; and does not cause interference with itself. In one embodiment, the OBC 100 is tested according to the ECE R10.05 EMC test, which includes testing devices in the frequency range of 30 MHz to 1000 MHz for broadband emissions. The test conditions for the broadband emissions test are specified in Annex 4 of ECE R10.05. The test limits are 34 dB (µV/m) from 30-75 MHZ and 45 dB (µV/m) from 400-1000 MHz as represented by reference curve (REF). The curve (S1A) represents the broadband emissions of the OBC 100, including the first switch 510 of the PFC circuit 500 (FIG. 5) during the test. As shown in the graph 700, S1 exceeds REF by as much as 15 dB between 40-70 MHz, as indicated by numeral 702.

Figure 8:
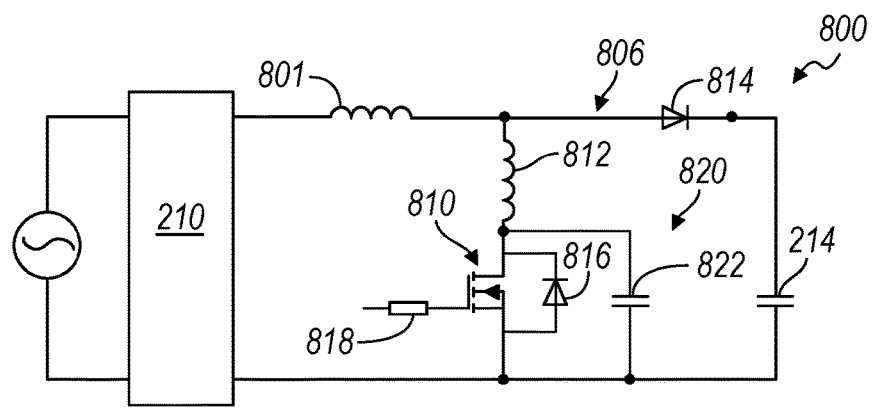
FIG. 8 is a simplified circuit diagram of the circuit of FIG. 3 according to one or more embodiments, illustrating the first switch with a first snubber circuit.

With reference to FIG. 8, a PFC circuit with a first snubber circuit is illustrated in accordance with one or more embodiments and is generally referenced by numeral 800. The PFC circuit 800 is connected between the pre-charge and bypass relay 210 and the bulk capacitor 214 described above with reference to FIG. 2. The PFC circuit 800 includes a choke 801 and a first switch circuit 806. The first switch circuit 806 includes a first switch 810, an inductor 812 to measure drain current, and a diode 814. The first switch circuit 806 also includes a parasitic diode 816 that is connected in parallel with the first switch 810, and a resistor 818 that is connected to the gate of the first switch 810. In one embodiment, the resistor 818 has a resistance of approximately 10.0 ohms. The PFC circuit 800 also includes a snubber circuit 820 including a capacitor 822 that is connected across the first switch 810, between the drain of the first switch 810 and ground. The capacitor 822 reduces the transient voltage present at the drain. In one embodiment, the capacitor 822 has a capacitance of approximately 100 pF.

Figure 9:
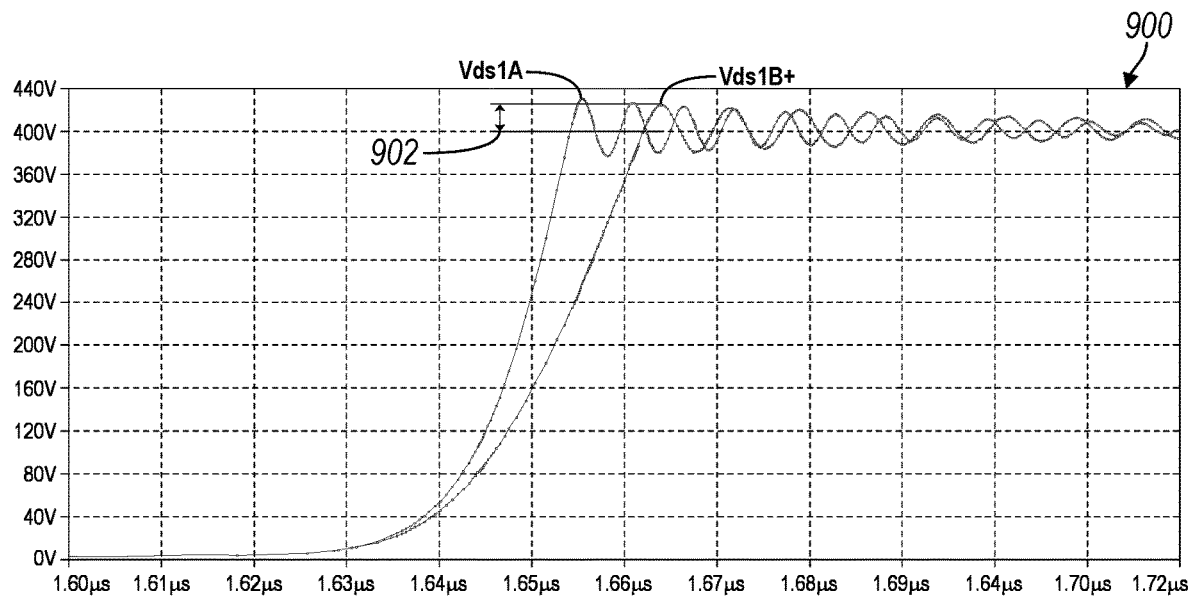
FIG. 9 is a graph of a voltage measured at the first switch of FIG. 8 when the switch is turned off along with the voltage measured at the first switch of FIG. 5 when the switch is turned off.

FIG. 9 is a graph 900 including a curve (Vds1B+) that represents the voltage potential between the drain (D) and the source (S) of the first switch 810 when it is turned off. The graph 900 also includes a second curve (Vds1A) that represents the voltage potential between the drain (D) and the source (S) of the first switch 510 of the PFC circuit 500 shown in FIG. 5. When the first switch 810 is closed, the drain current (not shown) decreases rapidly which causes the voltage potential (Vds1B+) to increase sharply due to stray inductances within the first switch circuit 806. As shown in FIG. 9, after the first switch 810 is closed, the resultant transient voltage of Vds1B+ overshoots the supply voltage by approximately 40 volts, as referenced by numeral 902, which is less than the overshoot of Vds1A, which illustrates how the snubber circuit 820 damps the transient voltage present on Vds1B+ during a switch-off condition, i.e., during a transition of the first switch 810 from the on-position to the off-position.

Figure 10:
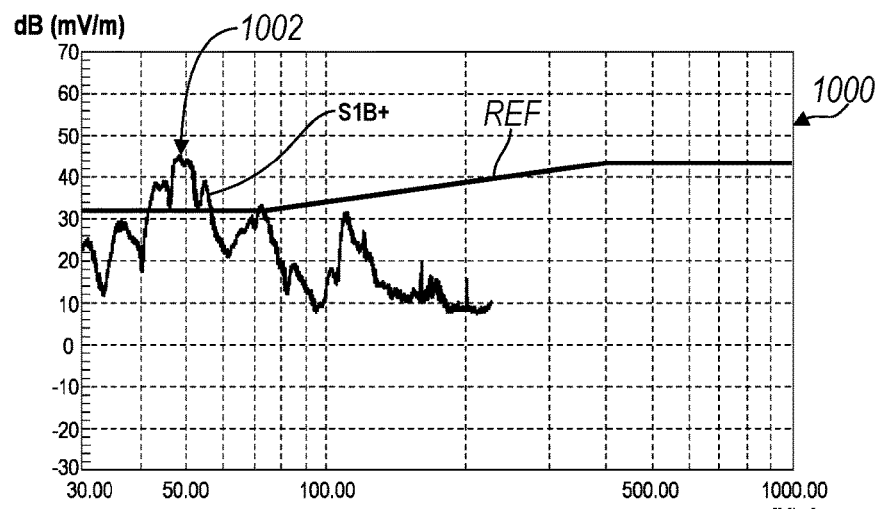
FIG. 10 is a graph of signals measured during a radio broadband EMC test of the vehicle during battery charging while the on-board charger, including the first switch and the snubber circuit of FIG. 8, is active.

FIG. 10 is a graph 1000 of a signal measured during a radio broadband EMC test of the vehicle 102 during battery charging. The test limits are 34 dB (µV/m) from 30-75 MHZ and 45 dB (µV/m) from 400-1000 MHz as represented by reference curve (REF). The curve (S1B+) represents the broadband emissions of the OBC 100, including the first switch 810 of the PFC circuit 800 (FIG. 8) during the test. As shown in the graph 1000, S1B+ exceeds REF by as much as 12 dB between 40-60 MHz, as indicated by numeral 1002, which is less than the amount S1A exceeds REF (FIG. 7), which illustrates that the snubber circuit 820 improves the EMC of the OBC 100 by damping the transient voltage present on Vds1B+ during a switch-off condition.

Figure 11:
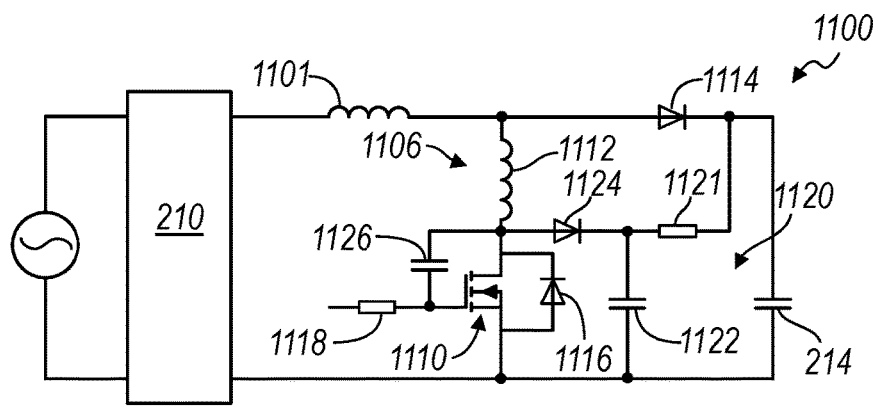
FIG. 11 is a simplified circuit diagram of the circuit of FIG. 3 according to one or more embodiments, illustrating the first switch with a second snubber circuit.

With reference to FIG. 11, a PFC circuit with a second snubber circuit is illustrated in accordance with one or more embodiments and is generally referenced by numeral 1100. The PFC circuit 1100 is connected between the pre-charge and bypass relay 210 and the bulk capacitor 214 described above with reference to FIG. 2. The PFC circuit 1100 includes a choke 1101 and a first switch circuit 1106. The first switch circuit 1106 includes a first switch 1110, an inductor 1112 to measure drain current, and a diode 1114. The first switch circuit 1106 also includes a parasitic diode 1116 that is connected in parallel with the first switch 1110, and a resistor 1118 that is connected to the gate of the first switch 1110. In one embodiment, the resistor 1118 has a resistance of approximately 10.0 ohms.

The PFC circuit 1100 also includes an RCDC snubber circuit 1120 including a resistor 1121, a capacitor 1122, and a diode 1124. The diode 1124 and the capacitor 1122 are connected together across the first switch 1110. The diode 1124 is connected to the drain of the first switch 1110 and the capacitor 1122 is connected between the diode 1124 and ground. The resistor 1121 is connected between the diode 1124 and an input of the bulk capacitor 214. The capacitor 1122 stores transient energy and then discharges the energy through the resistor 1121. The RCDC snubber circuit 1120 also includes a capacitor 1126 that is connected between the gate and the drain of the first switch 1110 to store transient energy and discharge the energy through the resistor 1118.

Figure 12:
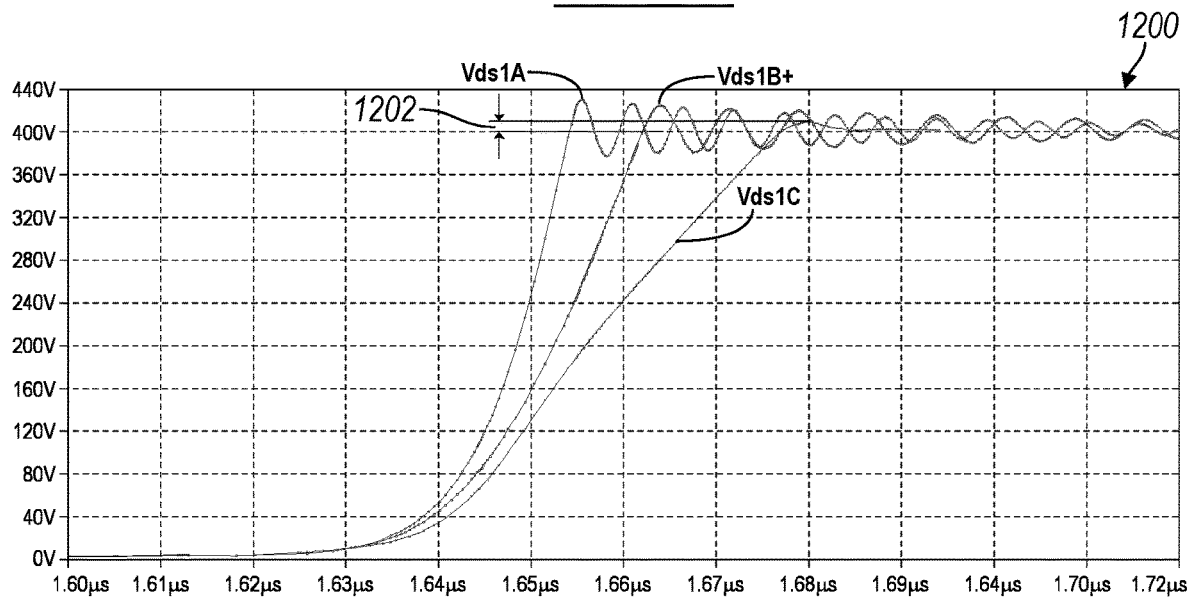
FIG. 12 is a graph of a voltage measured at the first switch of FIG. 11 when the switch is turned off along with the voltage measured at the first switch of FIG. 5 and FIG. 8 when the corresponding switch is turned off.

FIG. 12 is a graph 1200 including a curve (Vds1C) that represents the voltage potential between the drain (D) and the source (S) of the first switch 1110 of the PFC circuit 1100 (FIG. 11) when it is turned off. The graph 1200 also includes a second curve (Vds1B+) that represents the voltage potential between the drain (D) and the source (S) of the first switch 810 of the PFC circuit 800 shown in FIG. 8, and a third curve (Vds1A) that represents the voltage potential between the drain (D) and the source (S) of the first switch 510 of the PFC circuit 500 shown in FIG. 5. When the first switch 1110 is closed, the drain current (not shown) decreases rapidly which causes the voltage potential (Vds1C) to increase sharply due to stray inductances within the first switch circuit 1106. As shown in FIG. 12, after the first switch 1110 is closed, the resultant transient voltage of Vds1C overshoots the supply voltage by approximately 10 volts, as referenced by numeral 1202, which is less than the overshoot of Vds1A and Vds1B+, which illustrates how the snubber circuit 1120 damps the transient voltage present on Vds1C during a switch-off condition.

Figure 13:
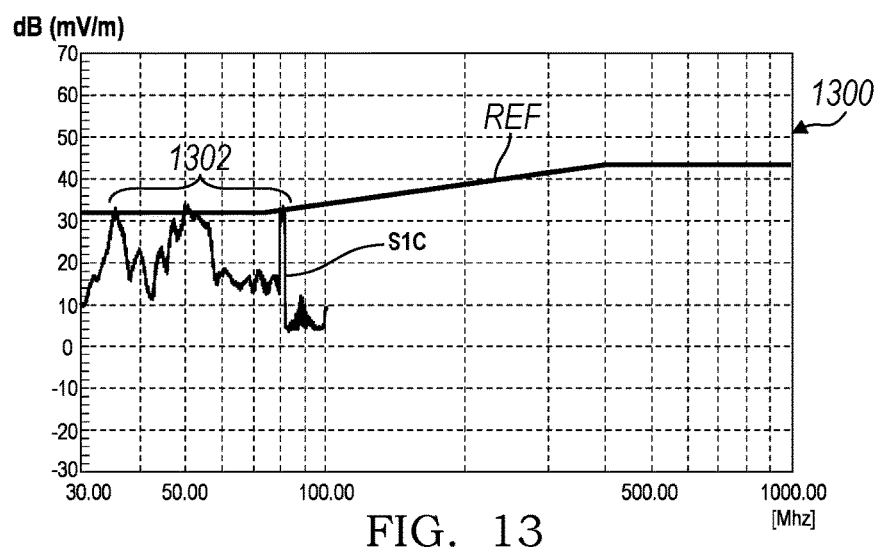
FIG. 13 is a graph of signals measured during a radio broadband EMC test of the vehicle during battery charging while the on-board charger, including the first switch and the second snubber circuit of FIG. 11, is active.

FIG. 13 is a graph 1300 of a signal measured during a radio broadband EMC test of the vehicle 102 during battery charging. The test limits are 34 dB (μV/m) from 30-75 MHZ and 45 dB (μV/m) from 400-1000 MHz as represented by reference curve (REF). The curve (SIC) represents the broadband emissions of the OBC 100, including the first switch 1110 of the PFC circuit 1100 (FIG. 11) during the test. As shown in the graph 1300, S1C exceeds REF by as much as 2 dB multiple times between 30-80 MHz, as indicated by numeral 1302, which is less than the amount S1A and S1B+ exceed REF (FIGS. 7, 10), which illustrates how the snubber circuit 1120 improves the EMC of the OBC 100 by damping the transient voltage present on Vds1C during a switch-off condition.

Figure 14:
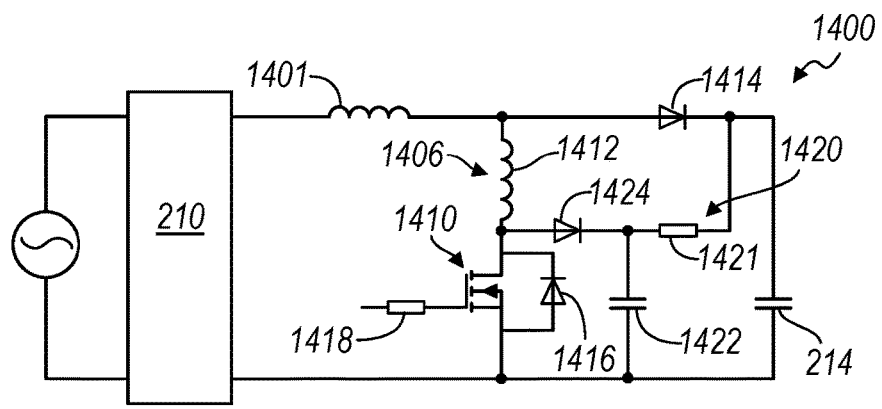
FIG. 14 is a simplified circuit diagram of the circuit of FIG. 3 according to one or more embodiments, illustrating the first switch with a third snubber circuit.

With reference to FIG. 14, a PFC circuit with a third snubber circuit is illustrated in accordance with one or more embodiments and is generally referenced by numeral 1400. The PFC circuit 1400 is connected between the pre-charge and bypass relay 210 and the bulk capacitor 214 described above with reference to FIG. 2. The PFC circuit 1400 includes a choke 1401 and a first switch circuit 1406. The first switch circuit 1406 includes a first switch 1410, an inductor 1412 to measure drain current, and a diode 1414. The first switch circuit 1406 also includes a parasitic diode 1416 that is connected in parallel with the first switch 1410, and a resistor 1418 that is connected to the gate of the first switch 1410. In one embodiment, the resistor 1418 has a resistance of approximately 10.0 ohms.

The PFC circuit 1400 also includes an RCD snubber circuit 1420 including a resistor 1421, a capacitor 1422, and a diode 1424, that is similar to the RCDC snubber circuit 1120 described with reference to FIG. 11, except the RCD snubber circuit 1420 does not include the second capacitor. The diode 1424 and the capacitor 1422 are connected together across the first switch 1410. The diode 1424 is connected to the drain of the first switch 1410 and the capacitor 1422 is connected between the diode 1424 and ground. The resistor 1421 is connected between the diode 1424 and an input of the bulk capacitor 214. The capacitor 1422 stores transient energy and then discharges the energy through the resistor 1421.

Figure 15:
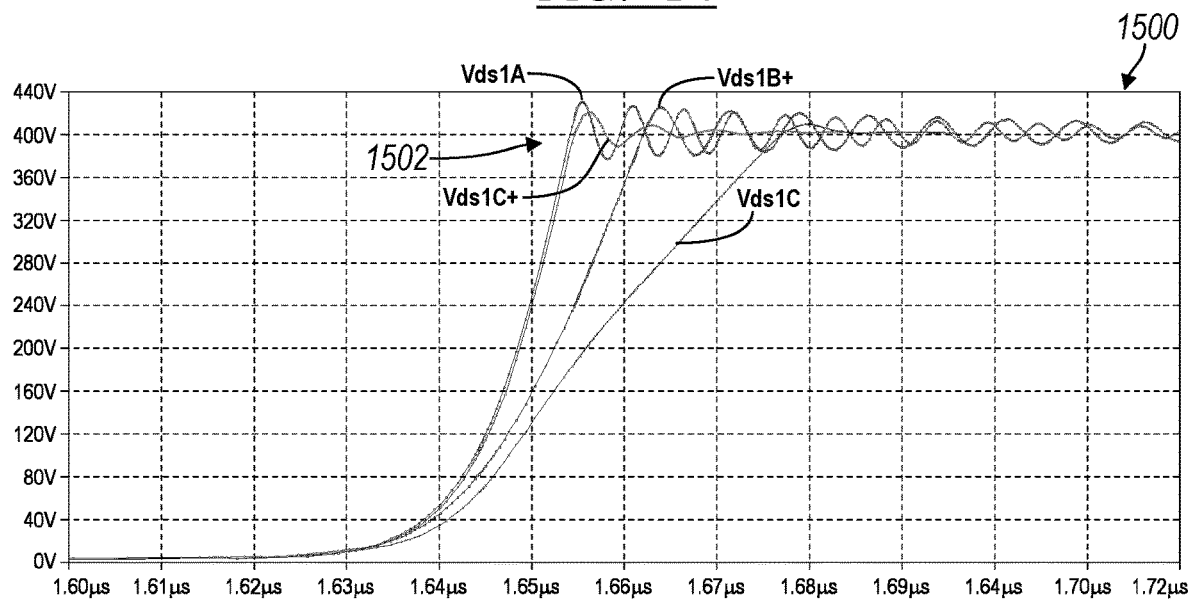
FIG. 15 is a graph of a voltage measured at the first switch of FIG. 14 when the switch is turned off along with the voltage measured at the first switch of FIG. 5, FIG. 8, and FIG. 11, when the corresponding switch is turned off.

FIG. 15 is a graph 1500 including a curve (Vds1C+) that represents the voltage potential between the drain (D) and the source (S) of the first switch 1410 of the PFC circuit 1400 (FIG. 14) when it is turned off. The graph 1500 also includes a second curve (Vds1C) that represents the voltage potential between the drain (D) and the source (S) of the first switch 1110 of the PFC circuit 1100 shown in FIG. 11, a third curve (Vds1B+) that represents the voltage potential between the drain (D) and the source (S) of the first switch 810 of the PFC circuit 800 shown in FIG. 8, and a fourth curve (Vds1A) that represents the voltage potential between the drain (D) and the source (S) of the first switch 510 of the PFC circuit 500 shown in FIG. 5. When the first switch 1410 is closed, the drain current (not shown) decreases rapidly which causes the voltage potential (Vds1C+) to increase sharply due to stray inductances within the first switch circuit 1406. As shown in FIG. 15, after the first switch 1410 is closed, the resultant transient voltage of Vds1C+ overshoots the supply voltage by approximately 30 volts, as referenced by numeral 1502, which is less than the overshoot of Vds1A and Vds1B+, which illustrates how the snubber circuit 1420 damps the transient voltage present on Vds1C+ during a switch-off condition.

Figure 16:
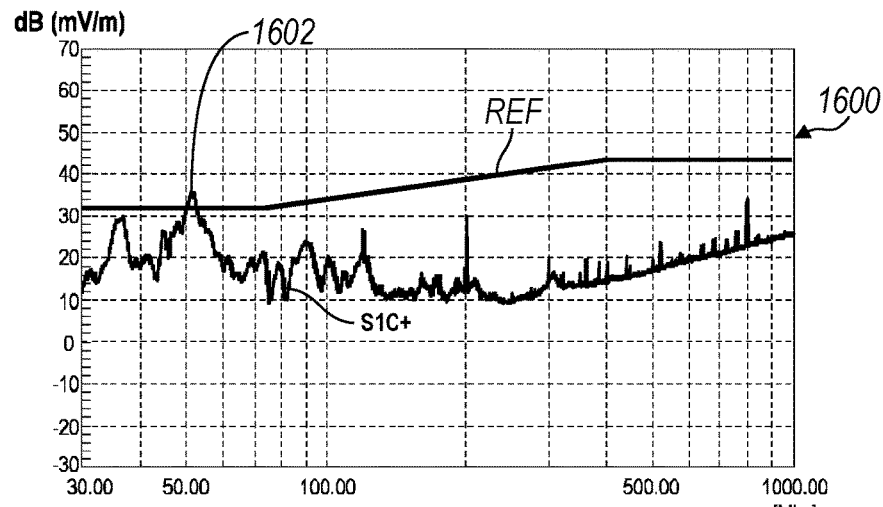
FIG. 16 is a graph of signals measured during a radio broadband EMC test of the vehicle during battery charging while the on-board charger, including the first switch and the third snubber circuit of FIG. 14, is active.

FIG. 16 is a graph 1600 of a signal measured during a radio broadband EMC test of the vehicle 102 during battery charging. The test limits are 34 dB (μV/m) from 30-75 MHZ and 45 dB (μV/m) from 400-1000 MHz as represented by reference curve (REF). The curve (S1C+) represents the broadband emissions of the OBC 100, including the first switch 1410 of the PFC circuit 1400 (FIG. 14) during the test. As shown in the graph 1600, S1C+ exceeds REF by as much as 2 dB around 50 MHz, as indicated by numeral 1602, which is less than the amount S1A, S1B+, and S1C exceed REF (FIGS. 7, 10, 13), which illustrates that the snubber circuit 1420 improves the EMC of the OBC 100 by damping the transient voltage present on Vds1C+ during a switch-off condition.

Figure 17:
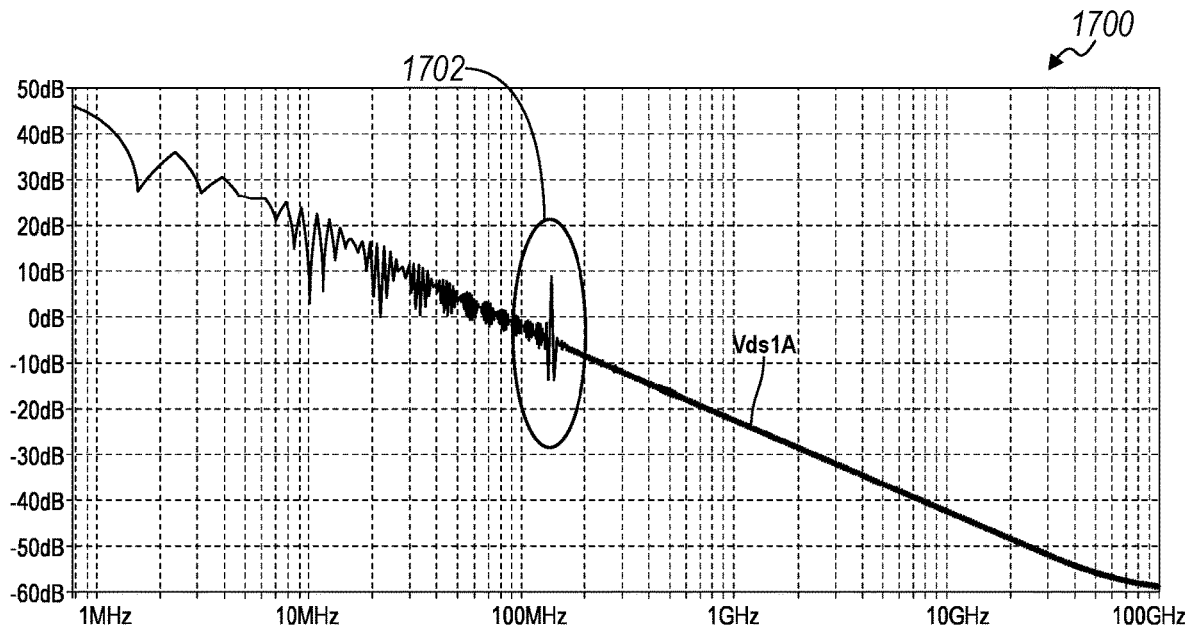
FIG. 17 is a fast-Fourier transform (FFT) of the circuit of FIG. 5, illustrating a frequency response.
Figure 18:
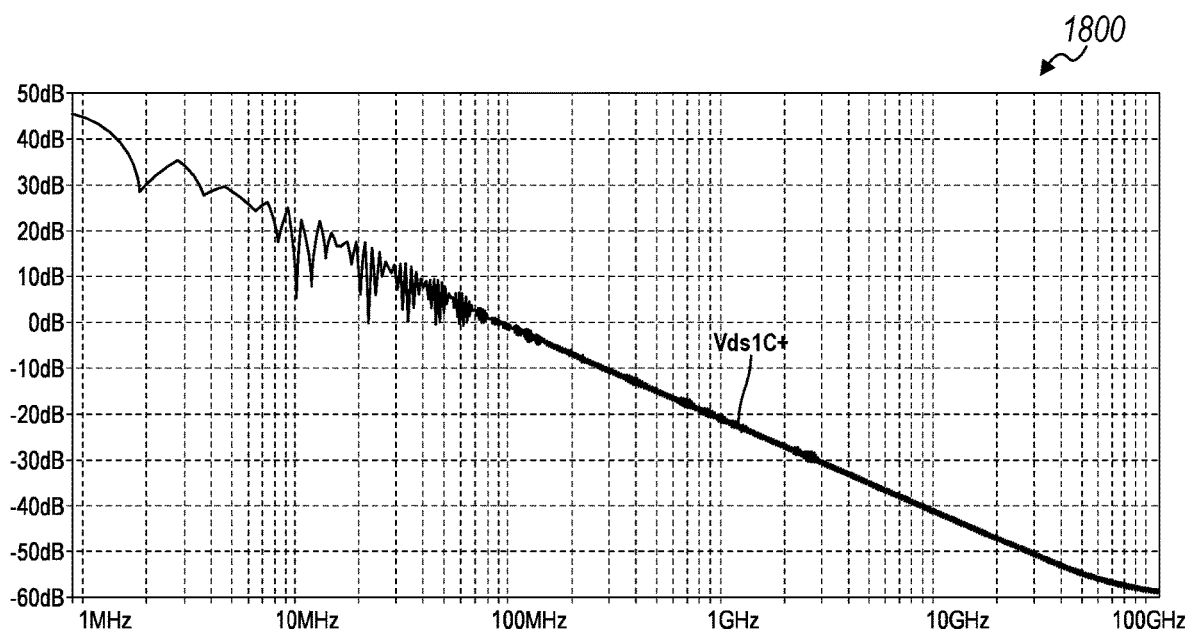
FIG. 18 is an FFT of the first switch and the third snubber circuit of FIG. 14, illustrating a frequency response.

FIG. 17 is a graph 1700 including a curve (Vds1A) illustrating the frequency response of the voltage potential between the drain (D) and the source (S) of the first switch 510 of the PFC circuit 500 shown in FIG. 5. FIG. 18 is a graph 1800 including a curve (Vds1C+) illustrating the frequency response of the voltage potential between the drain (D) and the source (S) of the first switch 1410 of the PFC circuit 1400 shown in FIG. 14. Vds1A includes resonance between 100-200 MHz, as referenced by numeral 1702, however this resonance is not present on Vds1C+, which illustrates a benefit of the snubber circuit 1420.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An on-board charger comprising:
    a bulk capacitor adapted to couple to a vehicle traction battery;
    a relay for receiving electrical power from an external power supply to pre-charge the bulk capacitor;
    a power factor correction (PFC) circuit connected between the bulk capacitor and the relay, the PFC circuit comprising:
        a switch adjustable between an on-position and an off-position, wherein the switch enables current flow from the relay to the bulk capacitor in the off-position,
        a snubber circuit coupled to the switch to damp a transient voltage present at the switch during a transition from the on-position to the off-position; and
    a processor programmed to control the switch.

2. The on-board charger of claim 1, wherein the snubber circuit comprises a capacitor coupled across the switch.

3. The on-board charger of claim 1, wherein the snubber circuit comprises:
    a diode coupled to an input terminal of the switch;
    a capacitor coupled between the diode and ground, wherein the diode and the capacitor are collectively coupled across the switch; and
    a resistor coupled between the diode and an input to the bulk capacitor.

4. The on-board charger of claim 3, wherein the snubber circuit further comprises a second capacitor coupled between the input terminal of the switch and a second terminal of the switch.

5. The on-board charger of claim 1, wherein the switch comprises a three-terminal semiconductor device with a source, a gate, and a drain, and wherein the snubber circuit comprises a capacitor coupled between the drain and ground.

6. The on-board charger of claim 5, wherein the snubber circuit further comprises:
    a diode coupled between the drain and the capacitor; and
    a resistor coupled between the diode and an input to the bulk capacitor.

7. The on-board charger of claim 6, wherein the snubber circuit further comprises a second capacitor coupled between the drain and the gate.

8. The on-board charger of claim 5 further comprising a resistor connected to the gate.

9. The on-board charger of claim 1, wherein the switch provides a ground path to disable current flow from the relay to the bulk capacitor in the on-position.

10. The on-board charger of claim 1 further comprising a rectifier coupled to the bulk capacitor to convert alternating current (AC) power to direct current (DC) power to facilitate charging of the vehicle traction battery.

11. An on-board charger comprising:
    a power factor correction (PFC) circuit connected between a bulk capacitor and a relay for pre-charging the bulk capacitor, the PFC circuit comprising:
        a switch, and
        a snubber circuit coupled to the switch to damp a transient voltage present at the switch during a switch-off condition; and
    a processor programmed to control the switch to enable/disable current flow from the relay to the bulk capacitor.

12. The on-board charger of claim 11, wherein the snubber circuit comprises a capacitor coupled across the switch.

13. The on-board charger of claim 11, wherein the snubber circuit comprises:
    a diode coupled to an input terminal of the switch;
    a capacitor coupled between the diode and ground, wherein the diode and the capacitor are collectively coupled across the switch; and
    a resistor coupled between the diode and an input to the bulk capacitor.

14. The on-board charger of claim 13, wherein the snubber circuit further comprises a second capacitor coupled between the input terminal of the switch and a second terminal of the switch.

15. A power factor correction (PFC) circuit to connect between a bulk capacitor and a relay of an on-board charger for pre-charging the bulk capacitor, the PFC circuit comprising:
    a switch adjustable between an on-position and an off-position, wherein the switch enables current flow from the relay to the bulk capacitor in the off-position; and
    a snubber circuit with a capacitor coupled across the switch to damp a transient voltage present at the switch during a transition from the on-position to the off-position.

16. The PFC circuit of claim 15, wherein the snubber circuit comprises:
    a diode coupled between an input terminal of the switch and the capacitor, wherein the diode and the capacitor are collectively coupled across the switch; and
    a resistor coupled between the diode and an input to the bulk capacitor.

17. The PFC circuit of claim 16, wherein the snubber circuit further comprises a second capacitor coupled between the input terminal of the switch and a second terminal of the switch.

18. An on-board charger comprising:
    a PFC circuit according to claim 15;
    a processor programmed to control the switch to adjust between the on-position and the off-position; and
    wherein the switch comprises a three-terminal semiconductor device with a source, a gate, and a drain, and wherein the capacitor is coupled between the drain and ground.

19. The on-board charger of claim 18, wherein the snubber circuit further comprises:
    a diode coupled between the drain and the capacitor; and
    a resistor coupled between the diode and an input to the bulk capacitor.

20. The on-board charger of claim 19, wherein the snubber circuit further comprises a second capacitor coupled between the drain and the gate.

* * * * *